(12) United States Patent
DeGraw

(10) Patent No.: US 9,611,098 B1
(45) Date of Patent: Apr. 4, 2017

(54) CONVEYOR APPARATUS

(71) Applicant: Darren L DeGraw, Farmington, UT (US)

(72) Inventor: Darren L DeGraw, Farmington, UT (US)

(73) Assignee: CLEASBY LLC, San Francisco, CA (US)

( * ) Notice: Subject to any disclaimer, the term of this patent is extended or adjusted under 35 U.S.C. 154(b) by 0 days.

(21) Appl. No.: 14/985,227

(22) Filed: Dec. 30, 2015

(51) Int. Cl.
| | |
|---|---|
| *B65G 15/62* | (2006.01) |
| *B65G 15/44* | (2006.01) |
| *B65G 15/64* | (2006.01) |
| *B65G 21/02* | (2006.01) |

(52) U.S. Cl.
CPC ............. *B65G 15/62* (2013.01); *B65G 15/44* (2013.01); *B65G 15/64* (2013.01); *B65G 21/02* (2013.01); *B65G 2207/10* (2013.01); *B65G 2207/48* (2013.01)

(58) Field of Classification Search
CPC ........ B65G 15/44; B65G 15/62; B65G 15/64; B65G 21/00; B65G 21/02; B65G 2207/10; B65G 2207/48
USPC .......... 198/860.1, 860.3, 861.1, 735.3, 735.4
See application file for complete search history.

(56) References Cited

U.S. PATENT DOCUMENTS

| | | | | |
|---|---|---|---|---|
| 5,685,687 A * | 11/1997 | Frye | ........................... | B60P 1/36 198/809 |
| 5,984,077 A * | 11/1999 | Frye | ........................... | B60P 1/36 198/317 |
| 6,907,979 B2 * | 6/2005 | Ford | ....................... | B65B 35/30 198/419.3 |
| 7,267,223 B2 * | 9/2007 | Spoors | .................... | B65G 21/02 198/816 |
| 7,874,419 B2 * | 1/2011 | Hosch | .................... | B65G 21/06 198/837 |
| 9,260,247 B2 * | 2/2016 | Miller | .................... | B65G 15/58 |

\* cited by examiner

*Primary Examiner* — Gene O. Crawford
*Assistant Examiner* — Keith R Campbell
(74) *Attorney, Agent, or Firm* — Cynthia Lamon; Lamon Patent Services

(57) ABSTRACT

A conveyor apparatus includes a conveyor belt supported by a first and a second roller assembly, a boom assembly housing the conveyor apparatus, the boom assembly including opposing side rails hosting roller assemblies at opposite ends thereof the side rails held parallel by a plurality of cross frame members. A drive motor connected to a chain sprocket and gear assembly fixed in turn to an axle of at least one of the roller assemblies drives the conveyor hydraulically. The conveyor apparatus further includes components protecting against wear from frictional contact with material conveyed, sudden static shock to an operator, and wherein the relatively non-conductive attributes of the component materials protect the operator from shock due to implied incidental contact with an external power source.

13 Claims, 3 Drawing Sheets

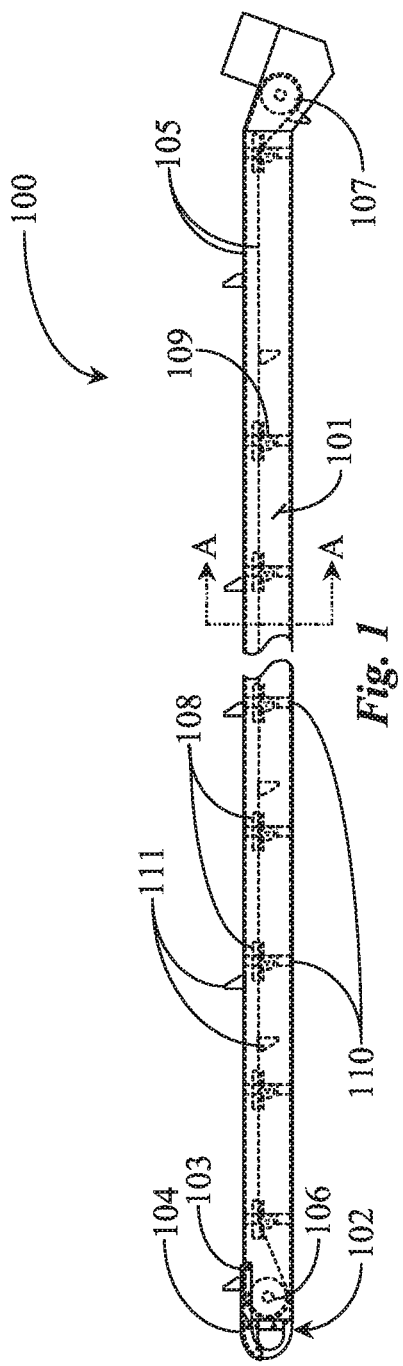
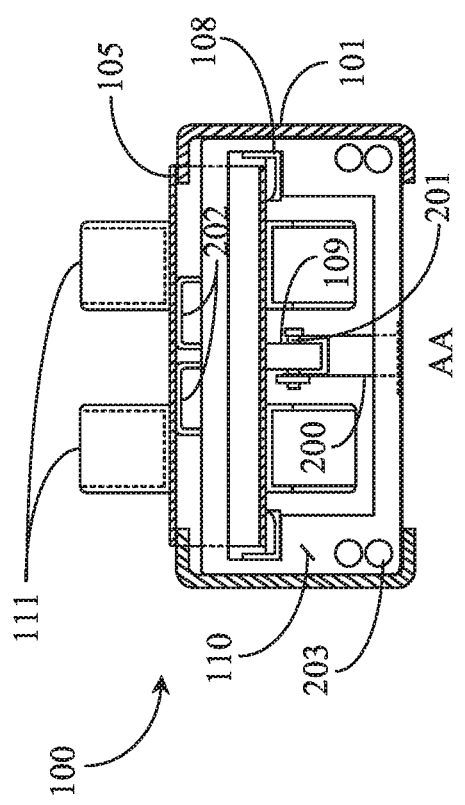

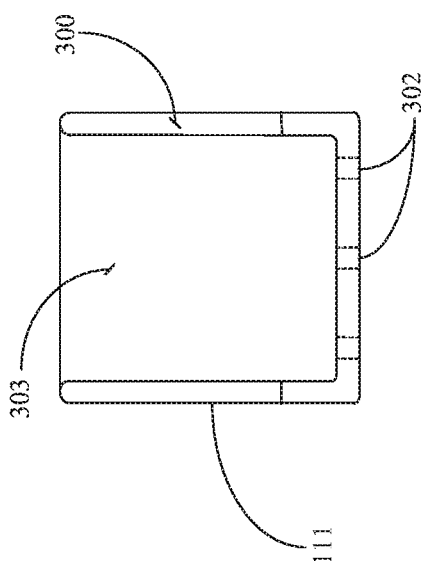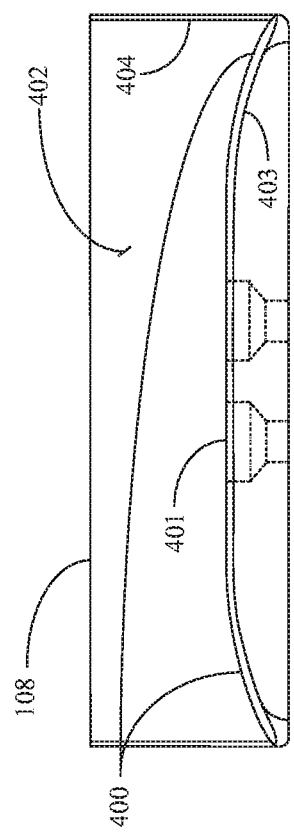

CONVEYOR APPARATUS

CROSS-REFERENCE TO RELATED DOCUMENTS

NA

BACKGROUND OF THE INVENTION

1. Field of the Invention

The present invention is in the field of construction equipment and pertains particularly to methods and apparatus for conveying materials onto and from a rooftop.

2. Discussion of the State of the Art

In the field of construction equipment, more particularly in the roofing industry, roofing materials have traditionally been carried or lifted onto a rooftop manually by the workers without any mechanical assistance. More recently, conveyor type systems including those that are hydraulically powered have been developed and used to convey heavy roofing materials such as roofing shingles for example from a ground location to the rooftop location where those materials will be applied in construction.

One such system is known to the inventor and is included herein at least by reference to U.S. Pat. No. 5,984,077 granted for a mobile overhead conveyor system. This system as known to the inventor may be referred to herein as Frye et al. The system of Frye et al is installed on a delivery truck that may deliver materials to a rooftop construction site. The system consists of a hydraulic rotary turret type base that supports, via a hydraulic lift mechanism or mechanisms, a boom structure housing a conveyor that can be operated under hydraulic power and positioned at an azimuth sufficient to convey roofing materials from the truck directly to a rooftop or from the rooftop back to the truck.

This system includes a feature that aids in the safety of operators and workers where electrical hazards exist such as nearby power lines or close electrical storm in that the main structural components of the boom, more particularly the side rails of the boom structure are fabricated from a non-conductive material such as fiberglass reinforced plastic beams. Also in this system, the conveyor belt is fabricated of a resilient and nonconductive polypropylene material. However other components include metals and pose a hazard still in some electrical circumstances.

It is critical that regular maintenance is conducted on a boom-assisted conveyor such as the one referenced above due in part to complexity of operation of the hydraulic components and controls for raising lowering and positioning the boom for materials delivery and return from a rooftop. Forces acting against such a conveyor include a large weight factor associated with moving heavy roofing materials up the conveyor and onto the roof. An operator on the roof may control the conveyor belt drive mechanism via a motor control unit made available at the upper (roof) end of the boom structure.

Such heavy material loads on the conveyor cause friction wear to components disposed at the upper end of the boom structure when the material is offloaded while the conveyor is running. This causes the wearing off of any protective non-conductive coatings applied to certain metallic components or other materials enclosing metal reinforcement materials of the system of Frye et al, such as metal in the conveyor "lugs" installed on the belt, for example.

Certain drive components (chain, sprocket), and other structural belt support components may undergo a buildup of static electricity. The system of Frye et al builds up static electric charge resulting from continued operation in ferrying materials on to and off of the rooftop. The above system is liable to produce a significant static shock under the right atmospheric conditions during operation of the conveyor to move materials, such shocks may be experienced by operators touching or coming too close to a worn portion of the boom structure or to any of the above mentioned components.

Another component that may become worn through operation is the conveyor belt by frictional contact with components of the system such as those touching the belt during motion. The wear of the belt may occur at the edges of the belt and to the interior surface of the belt from friction caused by material contact and by component contact. Therefore, what is clearly needed is a conveyor system adaptable to a truck-mounted hydraulic turret and boom structure that eliminates or greatly reduces the problems described above.

BRIEF SUMMARY OF THE INVENTION

The inventors provide a conveyor apparatus including a conveyor belt supported by a first and a second axially-mounted roller assembly, a boom assembly having a first and a second boom rail interconnected in parallel by a plurality of lower and upper cross frame members, the opposing ends of the boom assembly supporting the first and second roller assemblies, a conveyor drive motor connected to a chain sprocket and gear assembly fixed in turn to an axle of at least one of the roller assemblies, a motor stop and start control switch integrated with the drive motor, a plurality of belt guide plates strategically disposed in pairs at each cross frame member along both sides of the boom assembly, the guides making contact with the lower outer surface of the belt proximal to the belt edges, a plurality of material stops strategically attached to the outward surface of the conveyor belt the material stops disposed laterally across the belt surface in pairs disposed at spaced intervals along the length of the belt, a first and a second nose guard disposed at one end of the boom assembly one each per boom rail, and a first and second wear plate assembly attached, one assembly each, over the first and second nose guards.

In one embodiment, the conveyor belt, boom assembly, belt guide plates, material stops, nose guards, and wear plates are constructed of an electrically resistive material. In a variation of this embodiment, the belt guide plates, nose guards, material stops, and wear plates are manufactured of a delron material.

In one embodiment, the belt guide plates are elongate and rectangular in profile having a bottom plate and a back plate formed at one longitudinal edge rising roughly 90 degrees and along the length thereof. In this embodiment, the bottom plate is radially tapered at each end on the upper surface thereof the radial taper generally conforming to a natural sag factor of the belt at either side of the cross frame member hosting a pair of guide plates.

In one embodiment, the conveyor apparatus further includes a plurality of upper belt support rails disposed centrally on the upper surfaces of the cross members, a pair of rails disposed at each cross member. In a variation of this embodiment, the upper belt support rails are manufactured of delron. In one embodiment, the roller assemblies comprise an axle and a plurality of mounted wheels installed thereon.

In one embodiment, the conveyor system further includes a plurality of lower belt support wheels axially mounted and disposed substantially centrally at each lower cross member, the wheels freely rotable about their axis along the direction of the conveyor belt, the outer surface of each wheel communicating with the lower outer surface of the conveyor belt at an elevation that includes the belt-interfacing surfaces of the belt guide plates. In a variation of this embodiment, the wheels are manufactured of delron.

In one embodiment, the roller assemblies comprise an axle and one or more than one non-conductive cylinder mounted thereon. In a variation of this embodiment, the one or more than one cylinder is manufactured of delron. In one variation of the embodiment, there is one cylinder with raised radial edges proximal to each end of the cylinder, the radial edges adapted to help guide and secure the conveyor belt onto the cylinder.

BRIEF DESCRIPTION OF THE SEVERAL VIEWS OF THE DRAWINGS

FIG. 1 is a side elevation view of a conveyor apparatus according to an embodiment of the present invention.

FIG. 2 is a section view of the conveyor apparatus of FIG. 1 taken along the section lines AA.

FIG. 3 is a front elevation view of the material stop of FIG. 2.

FIG. 4 is a front elevation view of the belt guide plate of FIG. 2

DETAILED DESCRIPTION OF THE INVENTION

Figure 5:
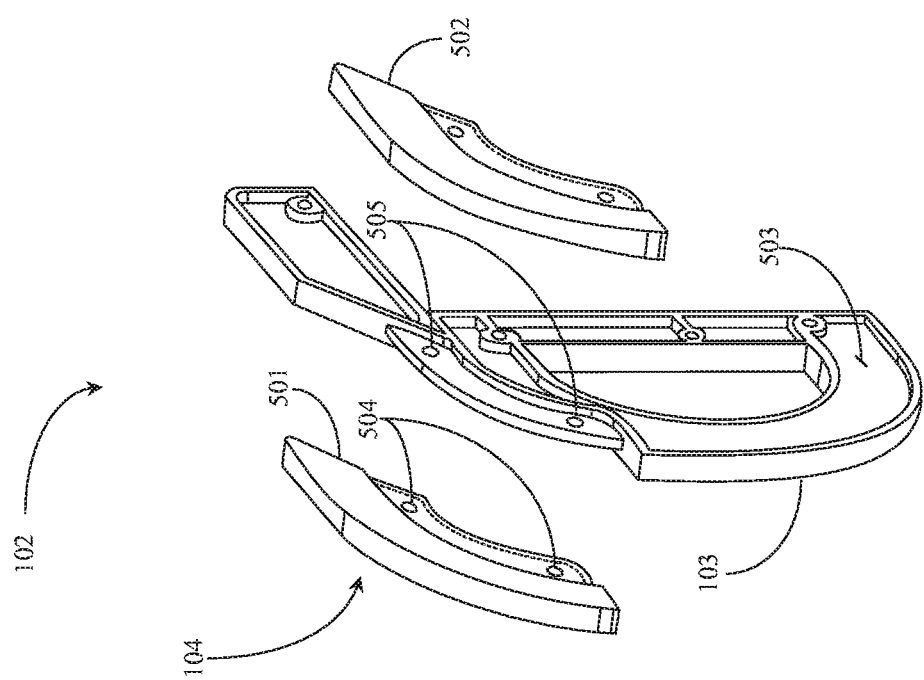
FIG. 5 is a perspective assembly view of a nose guard and wear plate assembly according to an embodiment of the present invention.

In various embodiments described in enabling detail herein, the inventors provide a relatively frictionless substantially nonconductive conveyor apparatus adaptable to a hydraulically-operated boom structure that reduces static buildup of electricity during conveyor operation and reduces frictional wear on one or more components of the conveyor apparatus including the conveyor belt. The present invention is described in enabling detail using the following examples, which may describe more than one relevant embodiment falling within the scope of the present invention.

FIG. 1 is a side elevation view of conveyor apparatus 100 according to an embodiment of the present invention. Conveyor apparatus 100 is adapted as a hydraulically powered conveyor belt 105 supported at both ends by roller assemblies 106 and 107 and by a hydraulically powered boom assembly constructed of substantially parallel side rails 101 held together by a plurality of structural cross frame members 110 disposed at spaced intervals (may be equally spaced) over the length of the boom. Boom rails 101 may be manufactured of fiberglass reinforced plastic. Cross frame members 110 form rectangular framing members having a partially open back, a bottom, a top and two sides forming a box like structure. In a preferred embodiment, cross frame members 110 are manufactured of a durable relatively nonconductive (electrically resistive) material such as fiberglass or delron material.

Side rails 101 may be bolted to or otherwise attached to cross frame members 110 to create a "boom housing" supporting conveyor apparatus components. Longitudinal bottom rails may also be provided and used to tie in the cross frame members at the bottom of the boom structure in one embodiment, for added support. Conveyor apparatus 100 includes a pair of nose loop assemblies 102, one per attached at one end of the boom rail structure with one loop assembly per side. Nose loop assemblies 102 are attached to the end of the boom structure that rests on a rooftop. The opposite end of the conveyor apparatus includes hardware for lift and vehicle turret mounting (not specifically illustrated). Lifts and lift support structures are not illustrated to improve clarity of the illustration.

Nose loop assemblies 102 include a nose loop 103 and a wear plate assembly 104. Nose loop 103 may be manufactured of fiberglass or another durable electrically resistive material. Wear plate assembly 104 comprises two half pieces or components that are installed over the top of nose loop 103 from opposing sides to protect the upper surface of the nose loops from frictional wear or damage from materials coming off of the conveyor. Wear plate assembly 104 may be manufactured of delron and may be fastened to nose loop 103 using standard nut and bolt hardware. It is noted herein that wear plate assembly 104 is modular and replaceable such that when it is worn down by frictional contact with materials it may be removed and replaced with a new assembly.

Conveyor apparatus 100 includes a first axially mounted roller assembly 106 disposed at one end and a second axially mounted roller assembly 107 disposed at the opposite end of the boom structure. A conveyor belt 105 fits over the roller assemblies. The conveyor belt may be adjusted relative to tight or loose tension over the rollers via a sliding plate-and-screw adjustment mechanism having mechanical connection to roller assembly 107 or the "lower pulley position". In one embodiment a roller assembly may include a plurality of axially mounted wheels that are fixed to the axle whereby the axle is driven under hydraulic power to turn the wheels. In this embodiment the non-powered roller assembly may include wheels that are freely rotable about a fixed axle.

In another embodiment there may be one or perhaps two elongate cylinders that may be axially mounted in place of multiple wheels. In this embodiment one or more cylinders may be grooved to reduce surface contact with the belt. In one embodiment rollers, whether cylinders or wheels are manufactured of delron or another polymer having a high resistance property to electrical conduction. In another variation of this embodiment the edges of the cylinders may be raised somewhat to aid in capturing and retaining the conveyor belt. In yet another variation of the cylinder embodiment a single cylinder may be tapered down slightly from the edges to center, helping to center the belt, improving grip on the belt, and reducing slippage or jumping of the belt in operation.

Conveyor belt 105 has a plurality of material stops 111 strategically disposed on the outer surface of the belt. Material stops 111 may be distributed in pairs affixed to the belt at measured intervals along the entire circumference of the belt. Material stops 111 are aligned in pairs orthogonally to the direction of conveyor belt 105. Material stops 111 have an angular side profile and are hollow or open on one side with a vertical face two side walls and a bottom mounting surface. The vertical face interfaces with material placed on conveyor 100 preventing the material from sliding down when the conveyor is positioned at an angle for rooftop delivery of materials. In one embodiment material stops 111 are manufactured from delron or another durable plastic with a high resistance to electric conduction.

Conveyor apparatus 100 includes a plurality of lower belt support wheels 109 disposed one per at each cross frame member 110 on the bottom upper surface thereof. Support wheels 109 may be manufactured of plastic having a high resistance to electrical conductivity. Support wheels 109 are axially mounted on support posts and may be freely rotable about their axis at an elevation above the bottom surface of the cross frame members sufficient to support the lower outer surface of conveyor belt 105.

Conveyor apparatus 100 includes a plurality of belt guide plates 108. Belt guide plates 108 are disposed in pairs at each cross frame member and are affixed to the cross frame members. Belt guide plates 108 include an elongate rectangular bottom plate and a vertical back plate. Guide plates 108 may be manufactured of delron or another electrically resistive material. Belt guide plates include machined features that reduce friction wear on the conveyor belt during operation. Moreover, guide plates 108 also conform to the natural sag or drop off in elevation of the lower portion of conveyor belt 105 as it travels through each cross frame member.

In one embodiment conveyor apparatus 100 includes a start and stop valve, lever, or other hydraulic control mechanism (not illustrated here) disposed near the upper or rooftop end of the boom structure proximal to nose loop assembly 102. Such a control mechanism enables an operator at the rooftop location to start and stop the conveyor. In one embodiment the general direction of the conveyor belt may also be reversed using the control mechanism at the rooftop or one provided at the turret end of the boom structure. In one embodiment there are two drive motors one at the open end of the boom structure and one at the turret end of the boom structure wherein when one motor is in use the other remains idle. Hydraulic hoses may be threaded through openings in the boom structure cross frame members and connected to a hydraulic drive motor at the upper end of the conveyor apparatus.

FIG. 2 is a section view of the conveyor apparatus of FIG. 1 taken along the section lines AA. Conveyor apparatus 100 is depicted in cross section for more clarity in illustration of the components. Side rails 101 are held together in parallel relationship by cross frame members 110. Guide plates 108 are affixed by screw, nut and bolt or by other fastening methods on opposing shelves of each cross frame member. Guide plates 108 may be manufactured from delron which has a high resistance to electric conduction and a very low frictional property further protecting the conveyor belt from wear at the edges.

Guide plates 108 prevent the conveyor belt (105) edges from rubbing against the cross frame members. Radii at either end of the belt guide are provided to taper the thickness dimension of the bottom plate that the conveyor belt rides on during its passage back through the internal space of the boom structure. The radiused bottom plates act to reduce sharp or abrupt drop off of the belt at the edges of the guide plates the radii conforming to the natural sag or dip of the conveyor belt as it leaves the support of the guide plates and support wheels at each cross frame member along the length of the boom structure. Other radii are also provided to the guide plates at strategic points to prevent the conveyor belt from snagging onto any corners or sharp edges.

Support wheel 109 is axially mounted to a post 200 using a pin or dowel or other axle component 201. Post 200 may be manufactured of delron or another polymer material having a high resistivity to electrical conduction. Post 200 may be bolted onto the bottom plate of cross frame member 110 and is disposed centrally as viewed in the cross section. In one embodiment there are openings 203 provided through cross member 110. Opening 203 may provide passage of hydraulic hosing through the boom structure and up to the nose of the conveyor apparatus where the drive motor for the conveyor is located. There may be one or more supply and return lines without departing from the spirit and scope of the present invention.

The back plate of cross frame member 110 is largely open in the central area in order to facilitate open space within the boom structure for the conveyor belt 105 including material stops 111 to pass through. The open space is sufficient that the material stops do not touch any other component of or part of the boom structure. Conveyor belt 105 rides on the upper surface of the boom structure and is supported proximal to the belts edges by boom side rails 101. In one embodiment upper support rails 202 may be provided and affixed to the top surface of each cross frame member 110. In this example there are a pair of rails 202 adjacent and strategically co located just on either side of the center of the conveyor apparatus. Support rails 202 may be fabricated of delron or similar polymer material having a high resistance to electric conduction and a low friction point.

Support rails 202 are U-shaped parts for supporting the center of conveyor belt 105 at the top of the boom structure. The elevation of the support rails 202 significantly coincides with the horizontal plane of the top surface of the connected boom side rails. The lower end of conveyor belt 105 rides on guide plates 108 and is supported at substantial center by support wheels 109. In this sectional view, the material stops 111 on the top side of conveyor belt 105 are moving toward the viewer and present a flat vertical face (material interface) orthogonal to the top surface of the belt. The material stops 111 at the bottom of the conveyor belt are moving away from the viewer and present the open side of the material stop. The material stop side walls on the open end are angled back away from the viewer, in one embodiment, approximately 30 degrees decreasing weight on the belt and stress on the installation point or points relative to the attachment of the stop to the conveyor belt.

FIG. 3 is a front elevation view of material stop 111 of FIG. 2. Material stop 111 is open on one side and has a back wall 303, which is the opposite side of the material interface side (vertical wall). Material stop 111 has a plurality of openings 302 provided through the bottom plate or surface for accepting a fastener such as a bolt for example. In one embodiment material stop 111 is fastened to the conveyor belt using a back plate (not illustrated) on the underside of the conveyor belt, the back plate having openings in alignment with openings 302. In another embodiment there may be back washers and nuts used at each of the openings.

Material stop 111 includes opposing side walls 300, which may be angle back away from the viewer approximately 30 degrees beginning at a specific elevation as depicted by cut lines. The hollow interior, resultant of fabrication, reduces the weight of material stop 111. Material stop 111 may be manufactured entirely of delron which is a substantially nonconductive polymer (electrically resistive) having sufficient strength to support material weight being ferried up to a rooftop. Edges of material stop 111 may be radiused to remove any sharp corners or edges that might snag onto material during the process of loading and unloading material on the conveyor.

FIG. 4 is a front elevation view of the belt guide plate of FIG. 2. Belt guide plate 108 includes a unique design providing for less frictional contact with the conveyor belt and a reduced angle of shear at both ends of the bottom plate. Belt guide plate 108 includes a back riser plate 402 that may protect the edges of the conveyor belt from contacting cross frame components. Belt guide plate 108 may be made entirely of delron combining polymer features of high resistivity to electrical conduction, structural rigidity and strength, and low coefficient of friction. Other material types such as Teflon for example are more abrasive to the conveyor belt.

Belt guide plate 108 includes a bottom plate top surface that is radiused to provide a taper (radii 400) at opposing edges of the plate toward center of the plate. Provision of such radii eliminates a sharp drop in elevation in conveyor belt (105) such as at drop off points and pick up points representing the edges of the guide plates. Cross frame members (110) hosting the belt guide plates are spaced strategically apart so the lower portion of the conveyor belt will sag somewhat even with the correct amount of tension in the belt.

Radii 400 conform to the natural drop off profile of the conveyor belt. The long edges of the bottom plate are also radiused to eliminate snagging and wear on the belt via a sharp edge. Referring now back to FIG. 2, the front corners of guide plate 108 are radiused to reduce contact with conveyor belt 105.

Referring now to FIG. 4, belt guide plate 108 includes counter-bored openings 401 provided through the bottom plate. Openings 402 accept mounting screws or bolts for mounting the plate onto opposing shelves of the cross frame members (110). Back plate 402 extends vertically a sufficient height to help insure that the belt does not touch any frame members even at lower belt tensions that may be too low for safe or proper operation.

In one embodiment back riser plate 402 maybe angled inward by a strategic amount sufficient to aid in urging the edges of the lower portion of the conveyor belt down restricting it to the surface area of the guide plates. In one embodiment the angle may be machined into the back riser plate or molded as such without departing from the spirit and scope of the present invention. Belt guide plates 108 aid in keeping material stops in the correct open passage way through the boom structure as viewed in FIG. 2 preventing the stops from making any contact with frame members or other components.

FIG. 5 is a perspective assembly view of nose loop assembly 102 according to an embodiment of the present intention. Nose loop assembly 102 includes a nose loop 103 and a wear plate assembly 104. Nose loop 103 may be affixed to the upper end of the boom structure at the side rails. There are two such nose loops provided one affixed rp8 proximal to the end of each boom rail. Nose loop 103 may be manufactured of fiberglass or another durable electrically resistive material. Wear plate assembly 104 comprises two half pieces 501 and 502 that are installed over the top of nose loop 103 from opposing sides to protect the upper surface of the nose loop from frictional wear or damage from materials coming off of the conveyor. Wear plate assembly 104 may be manufactured of delron and may be fastened to nose loop 103 using standard nut and bolt hardware through openings 504 and openings 505 on nose loop 103.

Nose loop 103 has a recessed surface 503 at both sides to achieve lighter weight without compromising structural integrity of the loop. Wear plate components 501 and 501 are identical parts and can be swapped in assembly. Wear plate assembly 104 provides a function protecting nose loop 103 from excessive wear and a function insulating an operator from sudden static shock that may build up while the conveyor is continually operated. Such a static electric shock may be powerful enough to distract an operator enough to cause serious injury.

Wear plate components 501 and 502 may be manufactured entirely of delron. Wear plate assembly 104 is replaceable if it becomes worn through frictional contact with materials being loaded or off loaded from the conveyor. Each wear plate component 501 and 502 has a double walled lower portion through which openings 504 are placed through (both walls). The inner edge of the nearest wall in perspective view is depicted herein with a broken edge line. Wear plate assembly 104 is installed over nose loop 103 where openings 505 are provided through a "rib" portion of the nose loop having the same thickness as recessed wall 503.

It will be apparent to one with skill in the art that the conveyor apparatus of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The invention is limited only by the breadth of the claims below.

The invention claimed is:
1. A conveyor apparatus comprising:
a conveyor belt supported by a first and a second axially-mounted roller assembly;
a boom assembly having a first and a second boom rail interconnected in parallel by a plurality of lower and upper cross frame members, the opposing ends of the boom assembly supporting the first and second roller assemblies;
a conveyor drive motor connected to a chain sprocket and gear assembly fixed in turn to an axle of at least one of the roller assemblies;
a motor stop and start control switch integrated with the drive motor;
a plurality of belt guide plates disposed in pairs at each cross frame member along both sides of the boom assembly, the guides making contact with the lower outer surface of the belt proximal to the belt edges;
a plurality of material stops attached to the outward surface of the conveyor belt the material stops disposed laterally across the belt surface in pairs disposed at spaced intervals along the length of the belt;
a plurality of lower belt support wheels axially mounted and disposed substantially centrally at each lower cross member, the outer surface of each wheel making contact with the lower outer surface of the conveyor belt at an elevation that includes the belt-interfacing surfaces of the belt guide plates.

2. The conveyor apparatus of claim 1 wherein the conveyor belt includes a first and a second nose guard disposed at one end of the boom assembly one each per boom rail and a first and second wear plate assembly attached, one assembly each, over the first and second nose guards.

3. The conveyor apparatus of claim 2 wherein the belt guide plates, nose guards, material stops, and wear plates are manufactured of an electrically resistive material.

4. The conveyor apparatus of claim 1 wherein the belt guide plates are elongate and rectangular in profile having a bottom plate and a back plate formed at one longitudinal edge rising roughly 90 degrees and along the length thereof.

5. The conveyor apparatus of claim 4 wherein the bottom plate is radially tapered at each end on the upper surface thereof the radial taper generally conforming to a natural sag of the belt at either side of the cross frame member hosting a pair of guide plates.

6. The conveyor apparatus of claim 1 further including a plurality of upper belt support rails disposed centrally on the upper surfaces of the cross members, a pair of rails disposed at each cross member.

7. The conveyor apparatus of claim 6 wherein the upper belt support rails are manufactured of delron.

8. The conveyor apparatus of claim 1 wherein the roller assemblies comprise an axle and a plurality of mounted wheels installed thereon.

9. The conveyor system of claim 8 wherein the wheels are manufactured of delron.

10. The conveyor system of claim 4 wherein the thickness of the belt guide plate is reduced radially at both ends the radii progressing from each end toward the center of the plate.

11. The conveyor apparatus of claim 1 wherein the roller assemblies comprise an axle and one or more electrically resistive cylinders mounted thereon.

12. The conveyor apparatus of claim 11 wherein the one or more cylinders is manufactured of delron.

13. The conveyor apparatus of claim 11 wherein one or more of the raised radial edges proximal to each end of the cylinder, the radial edges adapted to help guide and secure the conveyor belt onto the cylinder.

\* \* \* \* \*